United States Patent
Keshavachar

(10) Patent No.: US 6,631,274 B1
(45) Date of Patent: Oct. 7, 2003

(54) MECHANISM FOR BETTER UTILIZATION OF TRAFFIC CHANNEL CAPACITY IN GSM SYSTEM

(75) Inventor: Bhaktha Keshavachar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 08/866,950

(22) Filed: May 31, 1997

(51) Int. Cl.[7] .................................................. H04Q 7/20
(52) U.S. Cl. ....................... 455/466; 455/67.1; 455/434; 370/336
(58) Field of Search .................................. 455/434, 466, 455/419, 511, 450, 451, 452, 509, 67.1; 370/523, 522, 322, 435, 336

(56) References Cited

U.S. PATENT DOCUMENTS

| | | | | |
|---|---|---|---|---|
| 5,511,072 A | * | 4/1996 | Delprat | 370/336 |
| 5,625,872 A | * | 4/1997 | Sawyer | 370/435 |
| 5,640,395 A | * | 6/1997 | Hamalainen et al. | 370/322 |
| 5,778,316 A | * | 7/1998 | Persson et al. | 455/434 |
| 5,787,357 A | * | 7/1998 | Salin | 455/466 |
| 5,794,142 A | * | 8/1998 | Vanttila et al. | 455/419 |
| 5,806,000 A | * | 9/1998 | Vo et al. | 455/466 |
| 5,822,700 A | * | 10/1998 | Hult et al. | 455/466 |

OTHER PUBLICATIONS

Siegmund M. Redl., Matthias K. Weber and Malcolm W. Oliphant, An Introduction to GSM, pp. 252–253, Jul. 1995.*
Michel Mouly and Marie–Bernadette Pautet, "The GSM System for Mobile Communications" pp. 277–278, 1992.*

* cited by examiner

Primary Examiner—Lee Nguyen
(74) Attorney, Agent, or Firm—Blakely, Sokoloff, Taylor & Zafman LLP

(57) ABSTRACT

An enhanced mobile messaging system which has a service point access system configured to send short message service data during discontinuous periods of user-to-user data transmission over the same channel used for user-to-user data transmission. In another embodiment, a method for enhanced mobile messaging includes detecting voice activity on a dedicated channel. If voice activity is not detected, then short message service data is transmitted on the channel.

11 Claims, 5 Drawing Sheets

MECHANISM FOR BETTER UTILIZATION OF TRAFFIC CHANNEL CAPACITY IN GSM SYSTEM

BACKGROUND OF THE INVENTION

1. Field of the Invention

The invention relates generally to the field of communications. More specifically, the invention relates to mobile communications systems and networks.

2. Description of the Related Art

In cellular networks such as Global Systems Mobile (GSM), several types of messages can be communicated, such as control or data messages. In the case of GSM, message types are communicated using Service Access Point Identifiers (SAPI) at the "data link" layer ("data link" is specified in the well-known Open Systems Integration (OSI) networking model). Control information, such as timing and handshaking signals, which are transparent to users of the GSM network, are communicated using the SAPI0 (SAPI zero) interface. Short Message Services (SMS) are short, fixed-length messages (e.g. a string of 160 characters), such as paging messages, and are communicated using SAPI3 (SAPI three). Further, GSM uses several types of "channels" (communication pathways separated by frequency/time characteristics) for communicating messages over the network. Current practice allows for SAPI3 messages to be transmitted on only two such channels—Slow Associated Control Channel (SACCH) and Slow Dedicated Control Channel (SDCCH). A third channel, Fast Associated Control Channel (FACCH), as well as SDCCH can transmit SAPI0 information. Currently, however, there is no practice for transmitting SAPI3 over the FACCH.

A voice call sent over GSM is handled using the TCH (Traffic Channel), which is the channel defined in GSM for transferring user-to-user data such as voice. For transferring critical information such as certain control data, the voice traffic on TCH is pre-empted by the control data and sent over the FACCH. Thus, FACCH is the mechanism by which control data can utilize TCH for transmission. However, during periods of silence, when none of the connected users (mobile systems) are communicating voice, GSM currently prohibits the transmission of any other data, and makes the voice channel "dedicated." Since human beings are not always continuously talking, it would be advantageous to utilize the silent periods between voice traffic on the same channel for transmitting other types of messages such as paging messages.

Thus, there is needed a solution for utilizing silent periods on a dedicated voice or traffic channel for the communicating of data other than traffic that is currently prohibited.

SUMMARY OF THE INVENTION

In one embodiment, the invention provides an enhanced mobile messaging system which has a service point access system configured to send short message service data during discontinuous periods of user-to-user data transmission over the same channel used for user-to-user data transmission.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
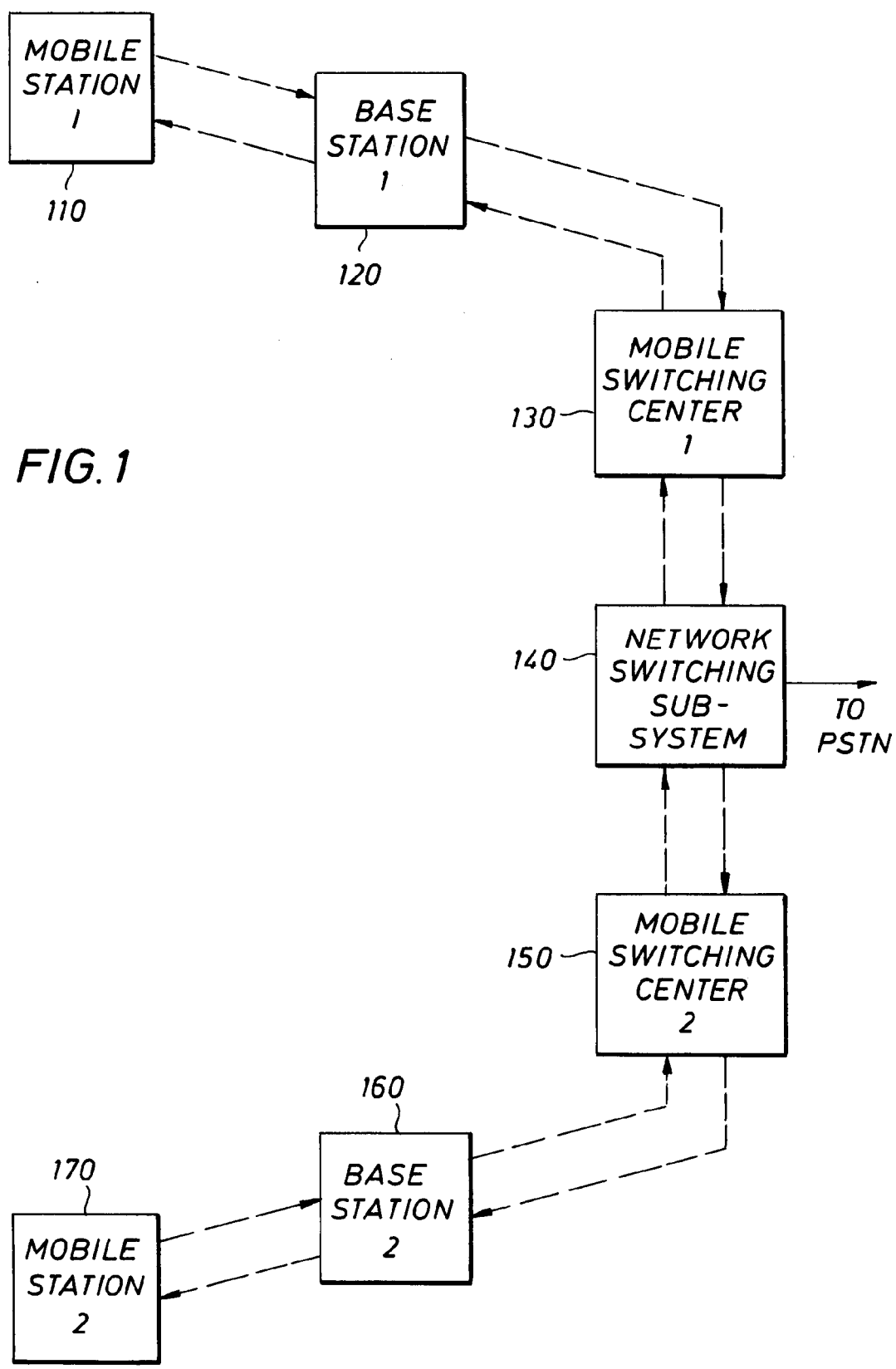
FIG. 1 is a system diagram of a cellular mobile communication session between two mobile stations.

FIG. 1 is a system diagram of a cellular mobile communication session between two mobile stations.

A first mobile station (MS) 110 and a second mobile station 170 represent cellular telephones (hand-held or car phone) or other information devices which are capable of cellular communications utilizing a high-frequency radio spectrum. Within a certain bounded geographical region, a single base station 120 is assigned to maintain and provide a communication pathway with one or more mobile stations, such as mobile station 110, that due to the mobile station's location, the base station 120 governs. One or more such base stations may be assigned to govern its own region and, in turn, will typically all "report" to a mobile switching center (MSC) such as MSC 130 which thus governs a large network area. MSC 130 then reports to a network switching sub-system (NSS) 140. NSS 140 connects out to other cellular or non-cellular switches such as PSTN (Public Switched Telephone Network). This allows the mobile station, in the case of the NSS 140 being connected out to a PSTN, to communicate with POTS (Plain Old Telephone System), ISDN (Integrated Services Digital Network) and other non-cellular wire based communication systems.

FIG. 1 also shows NSS 140 connected to a second mobile switching center (MSC) 150 which governs a different geographic region or network area than the first MSC 130. MSC 150 is assigned to cover a plurality of base stations, such as base station 160, each of which maintains and provides a radio communication pathway for one or more mobile stations, such as mobile station 170.

If mobile station 110 is to transmit voice, data or control messages, the communication link from MS 110 to BS 120 is called an "uplink". The reverse link, when mobile station 110 is receiving, from BS 120 to MS 110 is called "downlink". When MS 110 is transmitting voice on uplink to BS 120, the downlink is free and can be used for transferring other useful data (like Short Message Service (SMS) messages). Under current practice this transfer of user data on an unused path (uplink or downlink) of a dedicated voice link is prohibited. Similarly, there is no practice for allowing SAPI3 (Service Access Point Identifier) messages even when both uplink/downlink are not being utilized.

When MS 110 and MS 170 are both silent (if uplinking/downlinking no voice) the present invention provides that SAPI3, or SMS can be uplinked/downlinked using FACCH. This provides for better utilization of the FACCH bandwidth. When either of MS 110 or MS 170 are not uplinking voice during the voice call, that silent mobile station can uplink a SMS to the non-silent mobile station, or to any other mobile station. When both mobile stations are silent, both can uplink SMS. When voice communication commences at either MS, the uplink of SMS by that MS ceases to preserve the priority of voice over data.

The recognition of a voice uplink is achieved by utilizing Voice Activity Detection (VAD). In GSM systems, mobile stations are equipped with VAD and can operate under DTX (discontinues transmission). DTX provides the cessation of transmitted signal power when VAD indicates a period of silence. Thus, mobile stations conserve power by not transmitting data during periods of silence. However, current practice maintains the dedication of the FACCH channel to voice even though during the period of silence, zero or near zero power is being transmitted. Though mobile power is preserved, frequency or bandwidth utilization is not at a maximum under the current practice. During DTX silence periods, no other messages are allowed, even though there is no voice being uplinked/downlinked.

As mentioned earlier, GSM operates through the use of a Service Point Access system. By modifying the Service Point Access system to accept SAPI3 on a user-to-user data (such as voice) "dedicated" channel during periods of discontinuous transmission, the mobile messaging system is enhanced. According to one embodiment of the invention, the enhanced mobile messaging system has a service access point system that is configured to send short message service data during discontinuous periods of user-to-user data transmission on the same channel used for the user-to-user data transmission. In mobile, cellular communication, where an MSC is provided, software/hardware modifications on the MSC can be readily performed to implement the enhanced mobile messaging system as provided for by various embodiments of the invention.

Figure 2:
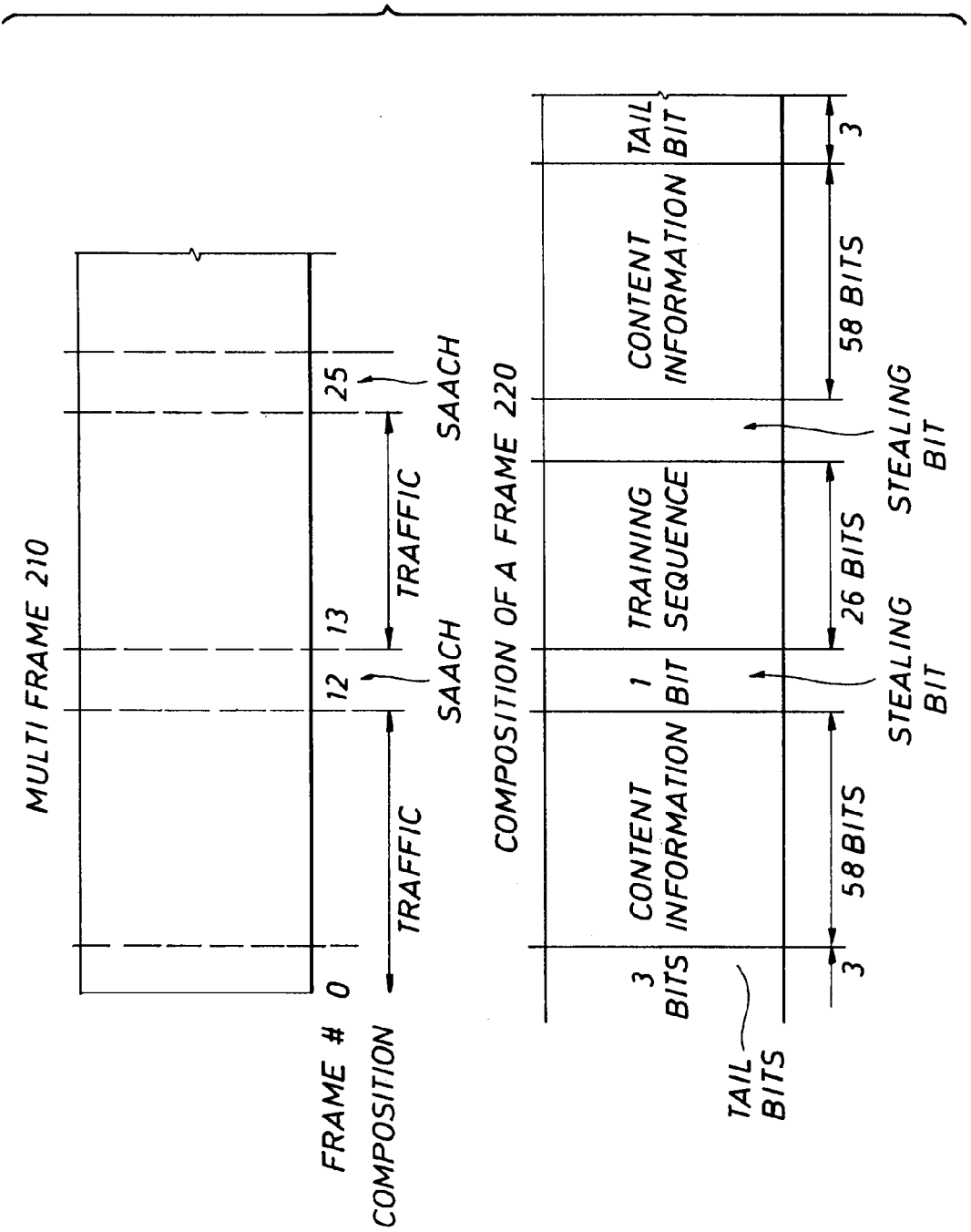
FIG. 2 shows exemplary data structures in GSM.

FIG. 2 shows exemplary data structures in GSM.

A multi-frame 210 is composed of a sequence of frames 220. Each frame 220 has 4 slots (in time domain)/bursts (so known in the frequency domain). Each slot/burst carries or encodes 148 bits of information. FIG. 2 also shows a slot/burst 220 and its composition. Slot/burst 220 has a total of 148 bits. The first three and last three bits are called tail bits and identify the start and end of the slot/burst. The next 58 bits are traffic—either user-to-user data, control messages or, according-to the invention, SMS messages. The 58 bit sequence of traffic includes a "stealing" bit. A training sequence of 26 bits follows and serves to train the equalizer in the receiver of the mobiles and MSC's and also helps in synchronization. Another 58 bit sequence, including a second stealing bit, follows the training sequence. Each stealing bit identifies whether the bits to follow are voice or user-to-user data or are other messages such as control messages. When the stealing bit is set, voice or user-to-user data is pre-empted in that slot/burst and currently, control data is present in lieu thereof. The stealing bit allows pre-emption of TCH for control data instead of voice.

A sequence of frames, each frame having four slot/bursts, 220 compose the multi-frame 210, as illustrated in FIG. 2. Message traffic is transmitted for 12 frames, such as frames 0–11, and the 13th frame, a SAACH (Slow Associated Control Channel) frame is transmitted. Currently SMS or SAPI3 messages are permitted to be transmitted over SAACH and SDCCH (Slow Dedicated Control Channel). The invention utilizes the current protocols and channels such that SMS messages are allowed when there is no voice traffic even when the channel is "dedicated" to voice. One key component of the invention is the utilization of the stealing bit to help determine message type.

Figure 3:
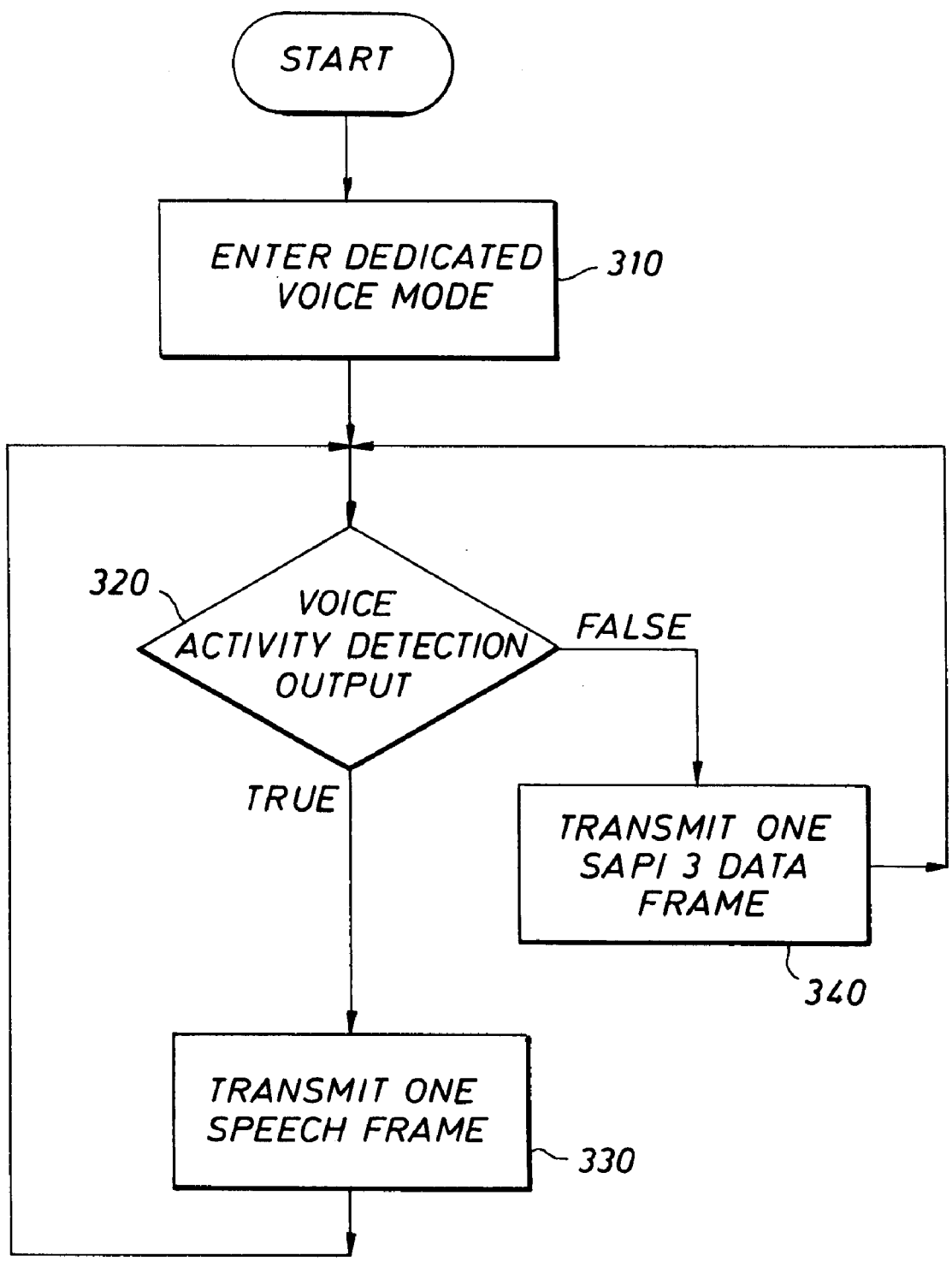
FIG. 3 is a flow diagram of enhanced messaging in a mobile station according to one embodiment of the invention.

FIG. 3 is a flow diagram of enhanced messaging in a mobile station according to one embodiment of the invention.

First, the mobile station enters into "dedicated" voice mode (step 310). Typically, the entry into dedicated voice mode commences upon the establishment of a call to/from the mobile station allowing downlink and uplink as described above. The mobile station is capable of listening for VAD output (checked at step 320). If VAD output is true, one frame of voice or speech is transmitted (step 330). If VAD output is false, this indicates that voice is not being transmitted (uplinked). When VAD output is false, therefore, the invention provides for transmitting one SAPI3 (SMS) message frame (step 340). VAD detection, according to step 320, repeats and continues for every style frame while the dedicated voice mode is still operative. The mobile station though in "dedicated" voice mode, is still capable, according to this embodiment, of transmitting SAPI3.

Figure 4:
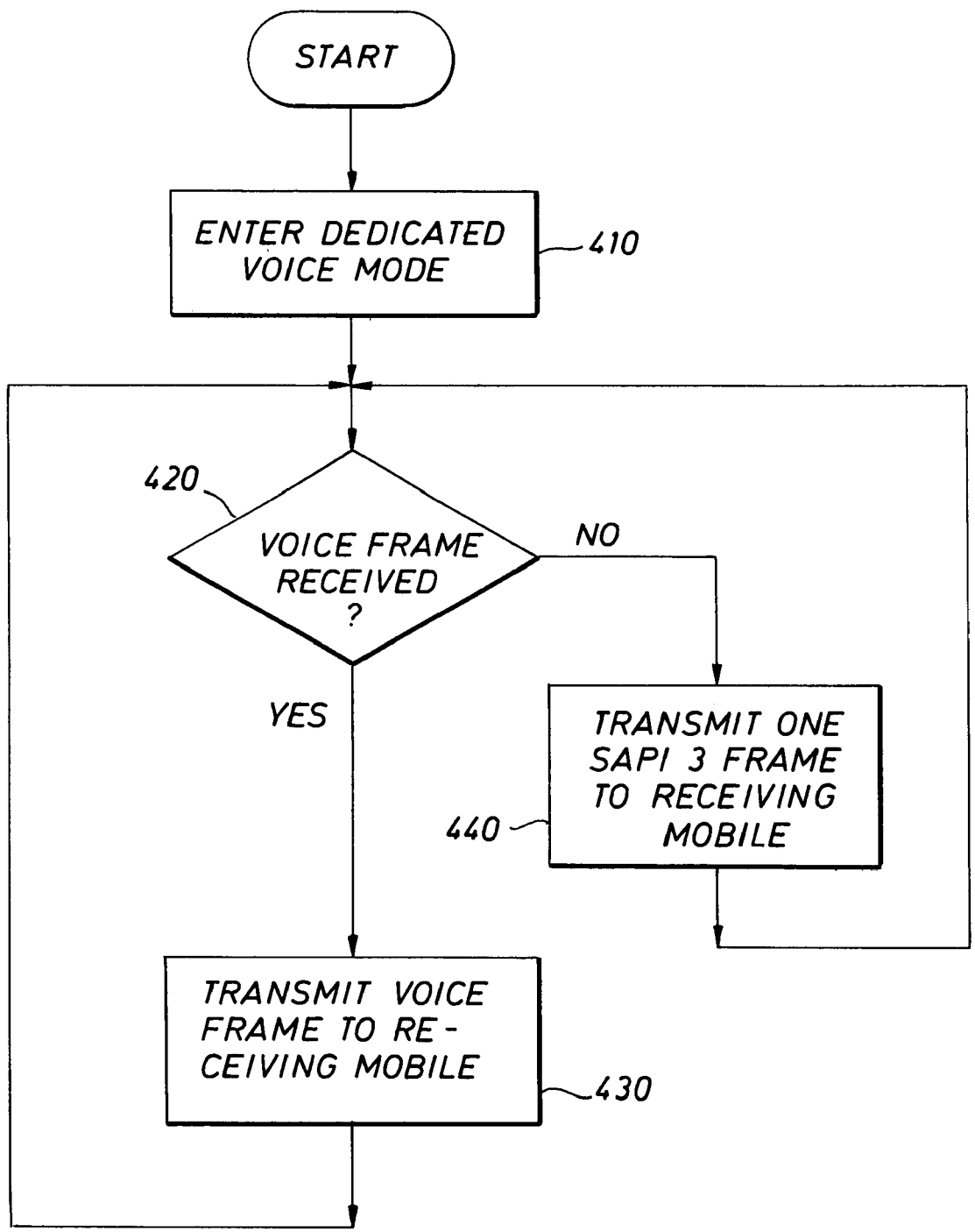
FIG. 4 is a flow diagram of enhanced messaging in a mobile switching center according to one embodiment of the invention.

FIG. 4 is a flow diagram of enhanced messaging as implemented in a mobile switching center according to one embodiment of the invention. The mobile switching center could be software upgraded to seamlessly incorporate the features of the invention, thereby facilitating SMS traffic on "dedicated" voice channels. When a frame of data (user-to-user data, control data, etc.) is transmitted (uplinked) from a mobile station, it is passed to the base station which finally forwards the frame onto the mobile switching center (MSC). The enhanced mode of messaging, according to an embodiment of the invention provides for the downlink of SAPI3 messages over the TCH. FIG. 4 describes the methodology for SAPI3 message downlink by an MSC.

First, the MSC enters into a "dedicated" voice mode (step 410). The MSC thereafter continually monitors for a received voice frame (step 420). If a voice frame is received, the MSC transmits the voice frame to the recipient (step 430). Thus, the TCH (traffic channel) mode is not actually fully "dedicated" to voice, but maintains a right of pre-emption for voice traffic. Instead, a SAPI3 frame is transmitted to the recipient (step 440). The steps 420–440 repeat while the MSC is in "dedicated" voice mode for the mobiles of interest.

Figure 5:
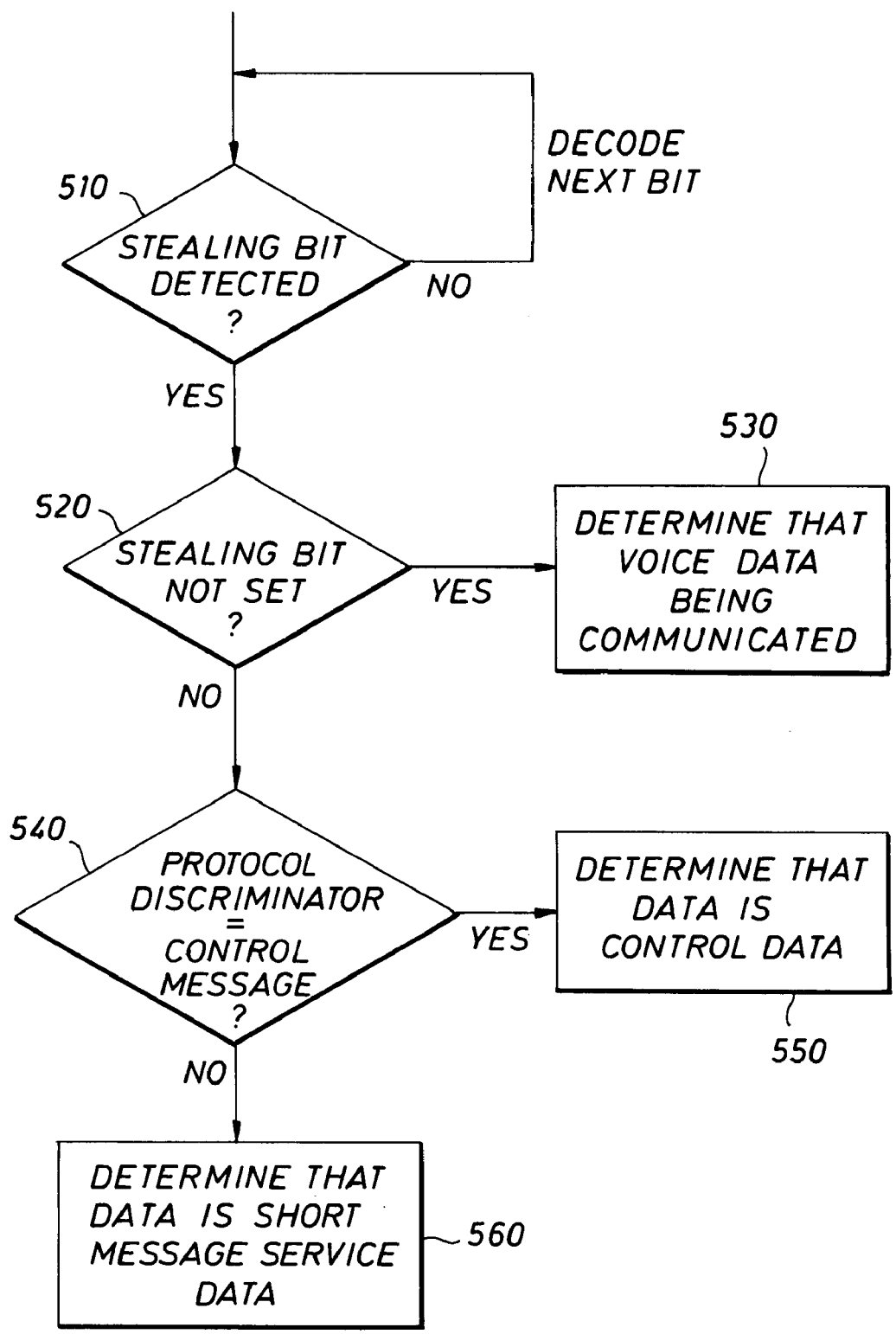
FIG. 5 is a flow diagram of determining based on the stealing bit, what type of message is being transmitted according to one embodiment of the invention.

FIG. 5 is a flow diagram of determining, based on the stealing bit, what type of message is being transmitted according to one embodiment of the invention.

When decoding a frame of four slots/bursts as shown in FIG. 2, it is possible to also determine the message type,— voice, SAPI0 or SAPI3—while in "dedicated" voice mode. The first step is to detect a stealing bit (step 510). If no stealing bit is detected, the next bit is decoded until a stealing bit is detected. If a stealing bit is detected, the next step is to determine whether the stealing bit is not set (step 520). If the stealing bit is not set, then the information being transmitted is determined to be voice (step 530). If the stealing bit is set, then it is either control information or user data. Depending on the value of the "Protocol Discriminator" field (checked at step 540), it is possible to determine whether the message is control data or FACCH (or SAPI0) or short message service data (SMS or SAPI3). The Protocol Discriminator is contained in the last 4 bits of the first octet of the data packet. The value of Protocol Discriminator field identifies the type of information that follows in a message. If the Protocol Discriminator field indicates a control message, then the information is control data (step 550). Otherwise, the message is determined to be short message service (SMS or SAPI3) data (step 560).

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A mobile messaging system comprising:
a service point access system configured to send short message service data during discontinuous periods of user-to-user data transmission among a number of mobile stations over the same channel used for user-to-user data transmission when a stealing bit is set, wherein the number of mobile stations uplink short message service data when the number of mobile stations are not transmitting user-to-user data transmission, said short message service data is a Service Access Point Identifier 3 message, said system configured for use in existing global system for mobile telecommunications cellular systems.

2. The mobile messaging system according to claim 1 wherein said channel is a Fast Associated Control Channel.

3. The mobile messaging system according to claim 1 further comprising a mobile switching center, said mobile switching center configured to implement said service point access system.

4. The mobile messaging system of claim 1, wherein the service point access system is configured to send short message service data during discontinuous periods of user-to-user data transmission among a number of mobile stations over the same channel used for user-to-user data transmission when a value of a protocol discriminator field within a data packet being sent indicates that the type of data is short message service data.

5. A method for mobile messaging among a number of mobile stations for use in existing Global System for Mobile telecommunications cellular systems comprising:

detecting user-to-user data transmission over a dedicated channel; and transmitting, if the user-to-user data transmission is not detected, by the number of mobile stations, short message service data over said dedicated channel, said short message service data is a Service Access Point Identifier 3 message, wherein the transmitting includes uplinking, by the number of mobile stations when the number of mobile stations are not transmitting user-to-user data transmission.

6. The method according to claim 5 wherein said dedicated channel is the Fast Associated Control Channel.

7. The method of claim 5, wherein detection of user-to-user data transmission is based on a stealing bit within a frame of data transmitted over the dedicated channel.

8. The method of claim 5, wherein the number of mobile stations are in a dedicated voice mode during transmission of user-to-user data transmission and transmission of short message service data.

9. A method for facilitating short message service communication between a first and second mobile for use in existing global system for mobile telecommunications cellular systems, said mobile having established a dedicated voice link, said method comprising:

detecting on a mobile switching center the receipt therein of a voice frame from said first mobile and second mobile; and uplinking a Service Access Point Identifier 3 frame from the first mobile and the second mobile if no voice frame is detected to be received at the mobile switching.

10. The method of claim 9, wherein said voice frame and said Service Access Point Identifier 3 frame is transmitted in a Fast Associated Control Channel.

11. The method of claim 9, comprising downlinking of short message service data over the dedicated voice link.

* * * * *